(12) United States Patent
Isik

(10) Patent No.: US 11,493,017 B2
(45) Date of Patent: Nov. 8, 2022

(54) TURBINE

(71) Applicant: Hasan Hüseyin Isik, Wil SG (CH)

(72) Inventor: Hasan Hüseyin Isik, Wil SG (CH)

( * ) Notice: Subject to any disclaimer, the term of this patent is extended or adjusted under 35 U.S.C. 154(b) by 91 days.

(21) Appl. No.: 16/955,968

(22) PCT Filed: Dec. 19, 2018

(86) PCT No.: PCT/CH2018/000053
§ 371 (c)(1),
(2) Date: Jun. 19, 2020

(87) PCT Pub. No.: WO2019/119163
PCT Pub. Date: Jun. 27, 2019

(65) Prior Publication Data
US 2021/0131398 A1    May 6, 2021

(30) Foreign Application Priority Data

Dec. 19, 2017  (CH) ........................ 1554/17

(51) Int. Cl.
*F03B 17/06* (2006.01)
*F03D 3/06* (2006.01)

(52) U.S. Cl.
CPC ............ *F03B 17/065* (2013.01); *F03D 3/067* (2013.01)

(58) Field of Classification Search
CPC ................ F03B 17/065; F03D 3/067
See application file for complete search history.

(56) References Cited

U.S. PATENT DOCUMENTS

| 302,769 A | 7/1884 | Pallausch |
| 1,109,839 A * | 9/1914 | Henry ............... F03B 17/061 415/7 |
| 3,938,907 A | 2/1976 | Magoveny et al. |

(Continued)

FOREIGN PATENT DOCUMENTS

| CH | 704066 A2 | 5/2012 |
| CH | 706300 A2 | 9/2013 |

(Continued)

OTHER PUBLICATIONS

International Preliminary Report on Patentability dated Jun. 23, 2020, with Written Opinion for PCT/CH2018/000053, filed Dec. 19, 2018 (English translation).

(Continued)

*Primary Examiner* — Justin D Seabe
*Assistant Examiner* — Brian O Peters
(74) *Attorney, Agent, or Firm* — Paul D. Bianco; Gary S Winer; Fleit Intellectual Property Law

(57) ABSTRACT

A turbine, in particular for harvesting energy in flowing air or flowing water, is easily adaptable to different application conditions and facilitating a comparably high degree of efficiency. This is achieved in that the basic shape of the turbine is cylindrical and is provided with blades which are parallel to an axis of the turbine. The blades are pivotally arranged in joints on the outer circumference of at least one turbine wheel. The blades are substantially L-shaped. The longer limb of the blade is curved preferably in a manner corresponding to the radius of the turbine casing, and the shorter limb lies within the surface line of the turbine.

20 Claims, 2 Drawing Sheets

(56) References Cited

U.S. PATENT DOCUMENTS

| | | | |
|---|---|---|---|
| 4,039,849 A * | 8/1977 | Mater | F03D 3/007 |
| | | | 290/55 |
| 4,468,169 A | 8/1984 | Williams | |
| 8,933,575 B2 * | 1/2015 | Lipman | F03B 17/065 |
| | | | 290/54 |
| 8,943,824 B2 * | 2/2015 | Isik | F03B 17/065 |
| | | | 60/639 |
| 2014/0217738 A1 | 8/2014 | Lipman | |

FOREIGN PATENT DOCUMENTS

| | | |
|---|---|---|
| CH | 707729 A2 | 9/2014 |
| EP | 2370691 B1 | 3/2013 |
| WO | 201063131 A2 | 6/2010 |

OTHER PUBLICATIONS

International Seach Report dated Feb. 14, 2019 for PCT/CH2018/000053, filed Dec. 19, 2018.
Written Opinion for PCT/CH2018/000053, filed Dec. 19, 2018.

\* cited by examiner

TURBINE

FIELD OF THE INVENTION

The invention relates to a turbine, in particular a water turbine for generating energy in flowing waters, or a wind turbine.

BACKGROUND

Turbines for generating energy, in particular also turbines in hydroelectric power plants are known. In most cases, they have a rotor arranged perpendicular to the direction of flow of the water with a rotatable turbine blade attached to it. The angle of attack of the turbine blades can be adjusted within limits, if necessary, and remains unchanged during operation.

Also known are drive wheels for grinding mills, hammer mills and drive wheels for riverboats, each with fixed blades.

Windmills with pivotable or adjustable blade elements are known from U.S. Pat. Nos. 3,938,907 and 4,468,169.

WO-A-2010063131 shows a water turbine which, in its basic shape, is cylindrical and provided with blades arranged parallel to an axis of the turbine. These blades are arranged to be pivotable in joints between turbine wheels at the outer circumference thereof. In another turbine according to EP 2370691 B1, the outer edges of blades are provided with a buoyancy-promoting, in particular, inflatable element, and according to CH 707729 A2 or CH 706300 A2, the blades may also be provided with a counterweight on their inner side.

Furthermore, it is known from CH 704066 A2 for such a turbine to couple the turbine blades with an additional mechanical operative connection. Said mechanical operative connection is achieved by means of a rod which is guided along the longitudinal axis of the turbine and which accordingly guides a pair of blades coupled together. A pair of blades is formed in each case by the blades facing each other on a diameter line. The rods are intended to support the opening and closing movement of the blades.

SUMMARY

One aspect of the invention relates to a turbine, in particular a turbine for generating energy in flowing waters or flowing air, to enable a comparatively high degree of efficiency by simple means.

The individual blades of a turbine are arranged in a jointed manner on the outer circumference of a turbine wheel. They pivot radially outwards under the influence of the flowing or streaming medium (water or air) and fold back inwards in the opposite direction (the side facing away from the direction of flow), preferably forming the shell of the turbine wheel(s). The blades are substantially L-shaped, with a long leg of the blade preferably bent corresponding to the radius of the turbine shell. The short leg is located within the shell and points against the direction of rotation of the turbine. It is arranged in such a manner that it corresponds with at least one stationary element arranged within the shell when the turbine is rotating. According to the invention, tilting up/folding out the blades when contacting the stationary element is supported by the short leg.

Preferred embodiments of the turbine are also disclosed.

Preferably, the at least one stationary element is formed as a pawl and arranged in a range of approx. 11.00 o'clock and/or 09.30 o'clock.

The angle of attack of the blades is 0° to approx. 90° to the tangent to the shell surface. Depending on the substantial flow direction or flow height, the blades can pivot out in the upper and/or lower part of the turbine.

Furthermore, an inflatable element, e.g. in the form of a hose or individual balls, can be arranged at the outer edge in the axial direction of the turbine, at least on some blades. At the beginning or during the pivoting out of the blades, the inflatable element can be filled with air or other gases, optionally inert gases, to accelerate the pivoting out.

An inert gas filling could be, e.g., helium, in particular when the invention is used as a wind turbine.

In the opposite direction, folding in the blades is supported by releasing the air. It is also possible to arrange the inflatable element only in the region of the outer edges (close to the turbine wheel) and not over the entire length of the blades.

Instead of a gas filling, the elements can be configured in the form of weights and accelerate opening of the blades in the lower region.

The outer shape of the long legs of the blades corresponds to a part of the shell surface of a cylinder. On the inside, the legs can also have guide vanes, which are either adjustable or fixed.

Preferably, the turbine has 4-16 blades.

It is also conceivable to arrange a plurality of turbines side by side and/or one above the other, e.g. in larger flowing waters or in the sea.

However, the invention is also usable as a pump, water pump, ship engine or the like, preferably including auxiliary aggregates.

BRIEF DESCRIPTION OF THE DRAWINGS

The invention is described below in more detail by an exemplary embodiment based on a drawing. In the figures.

DETAILED DESCRIPTION

Figure 1:
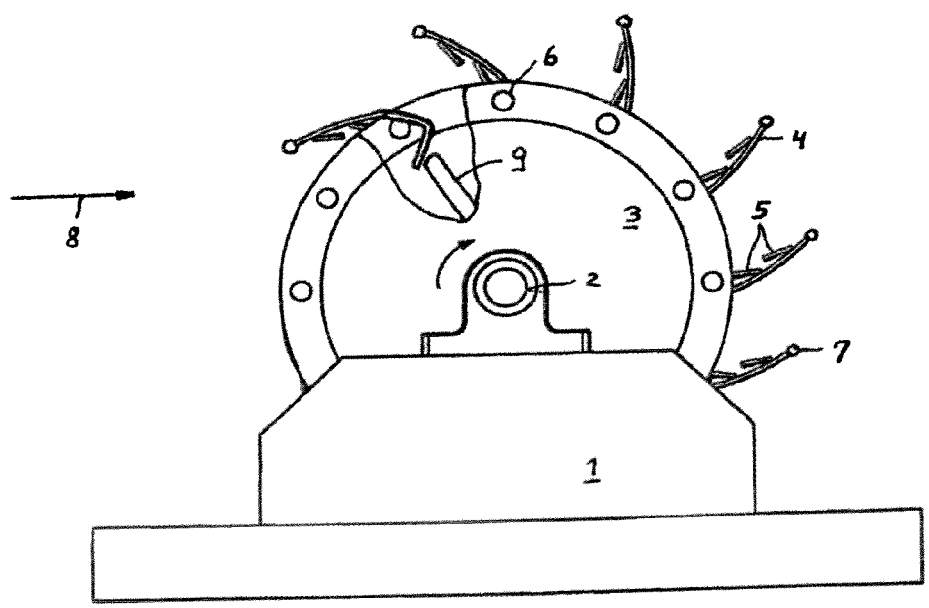
FIG. 1: shows a turbine according to the invention in a side view.

A turbine according to the invention, designed as a water turbine, is accommodated in a bearing 1, not illustrated in more detail, to be rotatable about its axis 2 and supported therein (FIG. 1). The direction of the axis 2 is approximately parallel to the water line of flowing water (and transverse to the direction of flow 8 of the flowing water), the turbine being arranged horizontally and completely submerged under water.

The turbine is cylindrical in its basic shape, with one turbine wheel 3 at each end face of the cylinder. The shell of the turbine is formed by twelve blades 4 (in folded position), which are arranged pivotably in pivot joints 6 of the turbine wheels 3. Accordingly, the pivot joints 6 are attached close to the circumference of the turbine wheels 3.

Figure 2:
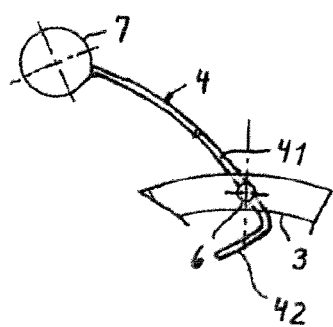
FIG. 2: shows details of a blade of the turbine according to FIG. 1.

The blades 4 are substantially L-shaped (FIG. 2), a long leg 41 of the blade 4 being preferably bent corresponding to the radius of the turbine shell. The short leg 42 is located within the shell surface line and points against the direction of rotation of the turbine. The short leg is arranged in such a manner that when the turbine is rotating, it corresponds with at least one fixed pawl 9 located within the shell.

According to the invention, tilting up/folding out the blades 4 when contacting the pawl 9 is supported by the short leg 42. (FIG. 1). In the example, the pawl 9 is arranged such that its tip points to about 11.00 o'clock, like a clock hand.

In the example, the blades 4 are provided on their inside with a guide vane 5. At the outer edge of each blade 4 in the example, there is also arranged a hose 7 or similar element that runs in the axial direction and can be inflated with air. In this case, the air is supplied and discharged by means of a supply unit, which is not illustrated.

The blades 4 pivot out as soon as their position is approximately parallel to the direction of flow 8 and the short leg 42 contacts the pawl 9.

After a rotation to approx. 270°, one blade 4 is completely folded in again. The water level can be arbitrary and the respective upper blade can also be located just above the water surface when the turbine rotates.

REFERENCE LIST

1 bearing
2 axis
3 turbine wheel
4 blade
5 guide vane
6 pivot joint
7 hose
8 direction of flow
9 pawl
41 long leg
42 short leg

The invention claimed is:

1. A turbine for generating energy in flowing air or in flowing waters, which is cylindrical in shape and which is provided with blades arranged parallel to an axis of the turbine, wherein the blades are pivotally arranged in pivot joints on an outer circumference of at least one turbine wheel, wherein the blades are substantially L-shaped and are provided on their inside surface with at least one guide vane, the at least one guide vane configured for guiding the flowing air or the flowing waters to reduce pressure on the blades;
wherein the blades are configured to pivot radially outwards under influence of the flowing air or the flowing waters and to fold back inwardly in an opposite direction forming a shell between turbine wheels;
wherein each of the blades has a long leg, bent corresponding to a radius of the shell, and a short leg arranged within an interior of the turbine inside of the shell defined by a surface of the shell; and
wherein at least one pawl is arranged as a stationary element within the interior of the turbine, the at least one pawl contactable by the short legs of the blades when the turbine is rotating.

2. The turbine according to claim 1, wherein the at least one pawl is upwardly inclined between 15° and 60° against an upstream direction of the flowing air or flowing waters.

3. The turbine according to claim 1, wherein the blades include 4 to 16 blades.

4. The turbine according to claim 1, wherein at least one of the blades has an outer edge parallel to the axis of the turbine.

5. The turbine according to claim 4, further comprising an inflatable element inflatable with a gas and arranged at the outer edge of the at least one of the blades, the inflatable element configured for accelerating outward pivoting of the blades.

6. The turbine according to claim 5, wherein the inflatable element is a hose or a ball.

7. The turbine according to claim 1, wherein the at least one guide vane is adjustably or fixedly positioned on an inside surface of the long leg.

8. A turbine array comprising a plurality of turbines according to claim 1.

9. The turbine according to claim 1, wherein a pivot point of each of the blades is located on a lower portion of the long leg above an angle of the L-shape.

10. A turbine for generating energy in flowing water or in flowing air, the turbine comprising:
a cylinder having a turbine wheel at each end face;
a plurality of blades arranged parallel to an axis of the turbine, the plurality of blades pivotally arranged in pivot joints on an outer circumference of at least one turbine wheel; and
at least one guide vane on an inside surface of each blade of the plurality of blades, the at least one guide vane configured for guiding the flowing water or the flowing air to reduce pressure on the plurality of blades;
wherein each blade of the plurality of blades is configured to pivot radially outwards under influence of the flowing water or flowing air and to fold back inwardly in an opposite direction forming a shell between turbine wheels at the end faces of the cylinder;
wherein each blade of the plurality of blades is an L-shaped piece having a long leg and a short leg on a same side of the at least one turbine wheel, the long leg bent corresponding to a radius of the shell and the short leg arranged interiorly within the shell defined by a surface of the shell, and
wherein a pivot point of each blade of the plurality of blades is located on a lower portion of the long leg above an angle of the L-shaped piece.

11. The turbine according to claim 9, further comprising at least one pawl arranged as a stationary element within the interior of the turbine, the at least one pawl contactable by the short legs of the plurality of blades when the turbine is rotating.

12. The turbine according to claim 11, wherein the at least one pawl is upwardly inclined between 15° and 60° against an upstream direction of the flowing water or flowing air.

13. The turbine according to claim 9, wherein the plurality of blades includes 4 to 16 blades.

14. The turbine according to claim 9, wherein at least one blade of the plurality of blades has an outer edge parallel to the axis of the turbine.

15. The turbine according to claim 14, further comprising an inflatable element inflatable with a gas and arranged at the outer edge of the at least one blade, the inflatable element configured for accelerating outward pivoting of the plurality of blades.

16. The turbine according to claim 15, wherein the inflatable element is a hose or a ball.

17. The turbine according to claim 9, wherein the at least one guide vane is adjustably or fixedly positioned on an inside surface of the long leg.

18. A turbine array comprising a plurality of turbines according to claim 9.

19. A turbine for generating energy in flowing air or in flowing waters, which is cylindrical in shape and which is provided with blades arranged parallel to an axis of the turbine, wherein the blades are pivotally arranged in pivot joints on an outer circumference of at least one turbine wheel, wherein the blades are substantially L-shaped in cross section and are provided on their inside surface with at least one guide vane, the at least one guide vane configured for guiding the flowing air or the flowing waters to reduce pressure on the blades;

wherein the blades are configured to pivot radially outwards under influence of the flowing air or the flowing waters and to fold back inwardly in an opposite direction forming a shell between turbine wheels;

wherein each of the blades has a long leg, bent corresponding to a radius of the shell, and a short leg arranged within an interior of the turbine inside of the shell defined by a surface of the shell;

wherein at least one pawl is arranged as a stationary element within the interior of the turbine, the at least one pawl contactable by the short legs of the blades when the turbine is rotating; and wherein a pivot point of each of the blades is located on a lower portion of the long leg above an angle of the L-shape.

20. A turbine array comprising a plurality of turbines according to claim 19.

\* \* \* \* \*